United States Patent
Barenbrug et al.

(10) Patent No.: US 7,532,220 B2
(45) Date of Patent: May 12, 2009

(54) SYSTEM FOR ADAPTIVE RESAMPLING IN TEXTURE MAPPING

(75) Inventors: Bart Gerard Bernard Barenbrug, Eindhoven (NL); Kornelis Meinds, Eindhoven (NL)

(73) Assignee: NXP B.V., Eindhoven (NL)

( * ) Notice: Subject to any disclaimer, the term of this patent is extended or adjusted under 35 U.S.C. 154(b) by 446 days.

(21) Appl. No.: 10/564,921

(22) PCT Filed: Jul. 21, 2004

(86) PCT No.: PCT/IB2004/051268

§ 371 (c)(1),
(2), (4) Date: Jan. 17, 2006

(87) PCT Pub. No.: WO2005/010826

PCT Pub. Date: Feb. 3, 2005

(65) Prior Publication Data

US 2006/0232598 A1  Oct. 19, 2006

(30) Foreign Application Priority Data

Jul. 30, 2003  (EP) ................... 03102350

(51) Int. Cl.
G09G 5/00 (2006.01)

(52) U.S. Cl. .................. 345/582; 345/428; 345/552; 345/586; 345/587; 345/606; 345/619; 382/260; 382/303

(58) Field of Classification Search .......... 345/586, 345/587, 614
See application file for complete search history.

(56) References Cited

U.S. PATENT DOCUMENTS 6,232,981 B1 * 5/2001 Gossett ................ 345/582
6,744,435 B2 * 6/2004 Zwicker et al. .......... 345/424

* cited by examiner

Primary Examiner—Antonio A Caschera

(57) ABSTRACT

An apparatus for mapping primitives of a 3D graphics model from a texture space to a screen space. The apparatus includes a texture memory for storing texture maps. A resampler resamples, for each primitive, data from a texture map that corresponds to the primitive to corresponding pixel data defining a portion of a display image that corresponds to the primitive. The texture space resampler and/or the screen space resampler is operative to select a resampling algorithm for performing the resampling from a respective set of at least two distinct resampling algorithms. The selection is done in dependence on a size of the primitive.

6 Claims, 5 Drawing Sheets

SYSTEM FOR ADAPTIVE RESAMPLING IN TEXTURE MAPPING

The invention relates to an apparatus for resampling a primitive from texture space to screen space and to a method of resampling a primitive from texture space to screen space.

BACKGROUND OF THE INVENTION

An important element in rendering 3D graphics is texture mapping. Mapping textures onto surfaces of computer-generated objects is a technique which greatly improves the realism of their appearance. The 2D or 3D object is typically modeled using primitives (usually triangles). The texture can be a 2D picture, such as a photograph or computer generated image. For example, (part of) a 2D image of a wall may be projected on a 3D representation of a wall in a computer game. The term "texel" (texture element) is used to refer to a picture element (pixel) of the texture.

In general, there are several methods known for mapping a texture map onto the screen grid. Most conventional computer graphics systems use a so-called inverse texture mapping approach. In this approach, pixels of the screen are processed sequentially and for each pixel, during a rasterization process, a projection of the screen pixel on the texture (resulting in a pixel's "footprint") is determined and an average value which best approximates the correct pixel color is computed, usually in the form of a weighted average. An alternative approach is the so-called forward texture mapping method. This method works by traversing texels in the coordinate system defined by the texture map (texture space). A vertex shader of the graphics system receives the vertices of a primitive as input and uses a vertex shading program to change or add attributes for each of these vertices. A rasterizer then traverses the primitive in texture space while interpolating these attributes. The rasterizer computes texture coordinates (u, v) for each texel to be projected to the triangle. For each grid position (u, v) of the texture visited, a texel shader receives attributes from the stored texture maps, after resampling the texture map to the texel grid by the texture space resampler. The texel shader calculates from these attributes the local color of the surface of the primitive. Finally, the obtained texel data is resampled to screen pixel locations by a screen space resampler. The mapping (including the resampling) is two-dimensional. A first resampling technique is the so-called one-pass 2D mapping, where in one pass over a primitive the pixel/texel data is resampled in both directions. An alternative technique is the so-called two-pass forward mapping approach wherein the mapping of a 2D image is decomposed in two 1D mappings. First, the image is mapped in one direction, typically the scan line direction, i.e. in horizontal direction, resulting in an intermediate image. The intermediate image is mapped in the other direction to the final image. The 1D resampling can be done using a resampler as commonly used for video scaling.

SUMMARY OF THE INVENTION

It is an object of the invention to provide an improved apparatus and method for mapping textures to primitives, maintaining a good balance between quality and performance.

To meet the object of the invention, an apparatus for mapping primitives of a 3D graphics model from a texture space to a screen space includes a texture memory for storing texture maps; and a resampler being operative to, for each primitive, resample data from a texture map that corresponds to the primitive to corresponding pixel data defining a portion of a display image that corresponds to the primitive; the resampler being operative to select a resampling algorithm for performing the resampling from a respective set of at least two distinct resampling algorithms; the selection being in dependence on a size of the primitive.

Traditionally, during the design of a graphics processing or video processing system a choice is made between forward or inverse mapping. Inverse mapping systems traditionally use one-pass 2D resampling. For forward mapping, a choice is made for one fixed sampling algorithm, either based on two-pass 1D resampling or one-pass 2D resampling. In the apparatus according to the invention, the resampler can choose between at least two resampling algorithms and no fixed choice is made. Instead, the choice between the algorithm is made dynamically per primitive, based on the size of the primitive. This enables using an optimal resampling algorithm for the primitive, where a balance may be chosen between quality of the resampling and system restrictions, such as available processing cycles and memory size. The apparatus may be based on an inverse mapping or forward mapping technique. The resampling may be performed by one resampler or multiple resamplers. For example, a forward texture mapping system may use a texture space resampler and a screen space resampler. Either or both of those resamplers may apply the dynamic selection of a resampling algorithm.

According to the measure of the dependent claim 2, the selection between the available algorithms is done by comparing the size of the primitive to a predetermined threshold. For a choice between two algorithms, one threshold value may be used, where the first algorithm is chosen for small primitives and the second algorithm, is chosen for large primitives. For more than two algorithms, several threshold values may need to be checked.

According to the measure of the dependent claim 3, the resampler is associated with a buffer for accumulating resampled data. The buffer has a predetermined buffer size. The threshold depends on a predetermined size of the buffer. For small primitives a resampling algorithm may be used that requires more buffer space (per pixel of the primitive). Such an algorithm may be chosen based on an advantageous characteristic of such an algorithm, such as high quality or processing speed. For large primitives, a resampling algorithm may be chosen that requires less accumulation buffer space (per pixel of the primitive). This may come at a cost, like an increase in processing cycles. A possible increase in processing cycles may be offset by using an algorithm that is more effective in processing larger primitives (e.g. having a relatively demanding initialization of the algorithm per primitive but an effective processing of the pixels).

According to the measure of the dependent claim 4, the size of the primitive depends on the number of texels or pixels within a boundary of the primitive. The number of texels may be calculated exactly but may also be estimated.

According to the measure of the dependent claims 5, a one-pass 2-dimensional resampling algorithm is selected for small primitives and a two-pass one-dimensional resampling algorithm is used for large primitives. The one-pass 2-dimensional resampling algorithm provides high quality resampling, with low initialization overhead per primitive, but requires a relatively large accumulation buffer (i.e. a 2D buffer). This makes the 2D resampling most suitable for small primitives. On the other hand, the two-pass one-dimensional resampling algorithm requires less buffer space (i.e. a 1D buffer), but has a higher initialization overhead per primitive. This makes the 1D resampling more suitable for larger primitives. The threshold is preferably chosen such that the accumulated data for a primitive with a size below the threshold just fits in the buffer using the 2D resampling.

To meet an object of the invention, a method of mapping primitives of a 3D graphics model from a texture space to a screen space includes:

resampling in a texture space, for each primitive, data from a texture map that corresponds to the primitive to texture data for texels associated with the primitive; and resampling in a screen space, for each primitive, the texture data to corresponding pixel data defining a portion of a display image that corresponds to the primitive; and selecting for the texture space resampling and/or the screen space resampling a resampling algorithm from a respective set of at least two distinct resampling algorithms; the selection being in dependence on a size of the primitive.

These and other aspects of the invention are apparent from and will be elucidated with reference to the embodiments described hereinafter.

DETAILED DESCRIPTION OF THE PREFERRED EMBODIMENT

Overview of the System

Figure 1:
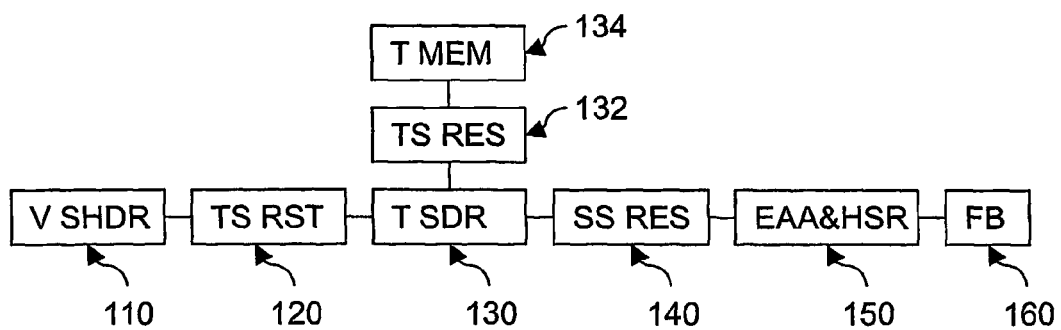
FIG. 1 shows a graphics pipeline of a forward texture mapping system.
Figure 2:
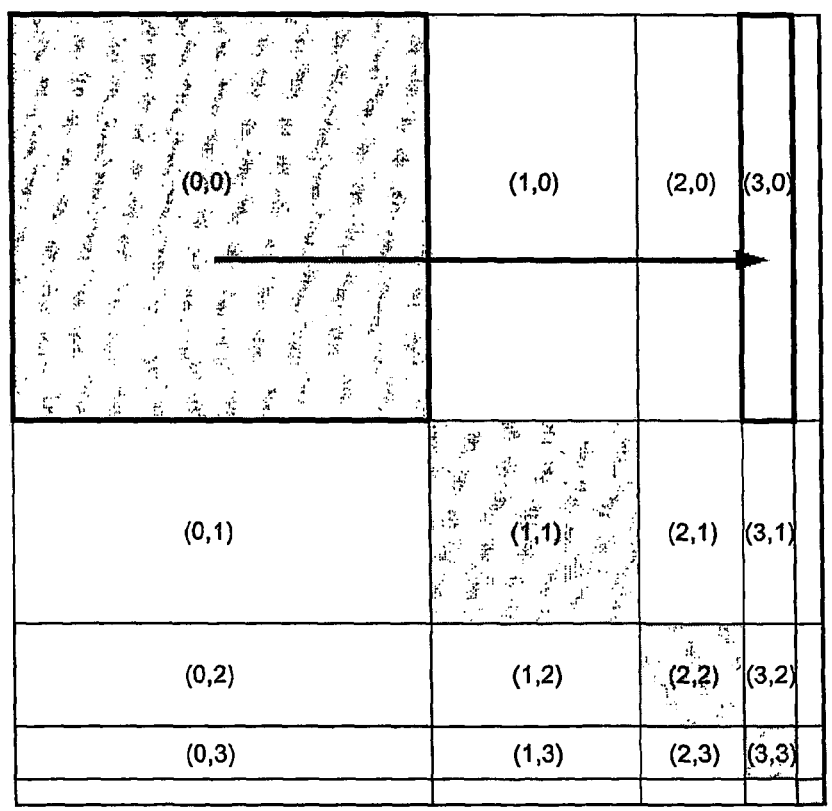
FIG. 2 shows a 4D mipmap structure.

The dynamic selection of the resampling algorithm may be used in an forward texture mapping system or an inverse texture mapping system. The system may include one or more resamplers. Any of those resamplers may use the dynamic selection. With reference to FIG. 1 a forward texture mapping system will be described with two resamplers. With reference to FIG. 2 an inverse texture mapping system will be described with one resampler.

FIG. 1 shows an exemplary architecture of the last stages of a graphics pipeline of a forward texture mapping system in which the invention may be utilized. In this description it is assumed that the models to be visualized are described using triangles as primitives. Persons skilled in the art can easily apply the same techniques to other primitives, such as other polygons or quads or curved surfaces such as Bezier patches. Input to the pipeline are primitives specified by its vertices by a graphics program, such as a computer game, and the earlier stages of the graphics pipeline. The primitives are given in the screen space, using (x, y) coordinates as well as the texel space, using the corresponding (u, v) coordinates. The pipeline includes a vertex shader 110, texture space rasterizer 120, texel shader 130 with a texture space resampler 132 and texture memory 134, a screen space resampler 140 and an Edge Anti-Aliasing and Hidden Surface Removal (EAA & HSR) unit 150. The outputted pixels are stored in a frame buffer 160 for display, for example using a D/A converter, such as a RAM DAC, to generate analogue output. If so desired also a digital interface, such as DVI, may be used to supply the pixel data to a display. The display may be of any type, including CRT, LCD, plasma display. Alternatively, the rendered picture may also be used as a texture map for subsequent primitives. The functions of the graphics pipeline shown in FIG. 1 will now be described in more detail to illustrate an exemplary system in which the invention may be used. It will be appreciated that the invention can also be applied in a video processing apparatus, such as a television, where, for example, a broadcast video signal is combined with graphical information modeled by primitives.

The vertex shader 110 of FIG. 1 receives the vertices of a triangle (primitive) as input and uses a vertex shading program to change or add attributes for each of these vertices. The data provided by the vertex shader usually includes attributes like diffuse and/or specular color, texture coordinates, (homogeneous) screen coordinates, and sometimes extra data like surface normals or other data required for the shading process. The vertex shader may be a traditional Transform and Lighting unit. The attributes generated by the vertex shader are offered to a rasterizer.

The rasterizer 120 of FIG. 1 operates in surface space (a so-called forward texture mapping system). The rasterizer traverses a parameterization of the surface of the primitive (rather than the projection on the screen), by selecting, for example, the texture coordinates (instead of screen coordinates) as the driving variables for the rasterization process. The rasterizer traverses the primitive over a "surface grid". The grid associated with a texture map provides such a surface grid, and is preferably used as surface grid (since obtaining texture samples on a texture grid does not require resampling). In absence of texture maps, or when for example textures are 1D or 3D, another grid may be chosen. As the coordinates in the texture space are used u (for the 'horizontal' direction) and v (for the 'vertical' direction). It will be appreciated that 'horizontal' and 'vertical' in this description are only relative. For example, the screen may be rotated, leaving the graphics processing unaffected but rotating the output on the screen. Since the texture grid is often used as the surface grid, the notation "texture grid" (and "texture space" and "texel") will be used to denote such generalized grids (and associated spaces and samples). As the rasterizer traverses the texel positions of the grid, all attributes that were given at each vertex are interpolated over the grid (typically linearly, except for the screen coordinates to which a texel is projected, which are interpolated perspectively). The attributes are then available at each texel location, where the texel shader 130 can use them. While traversing the u and v texture coordinates of the base grid, the rasterizer also maintains the corresponding screen coordinates (x, y) (or vice versa for an inverse mapping system). The correspondence can be maintained by linear interpolation of $\hat{x}$, $\hat{y}$ and $\hat{w}$, where the ^ denotes homogeneous coordinates. Such coordinates are well-known in the art and will not be described any further here. Screen coordinates can then be calculated using the perspective division $$x = \frac{\hat{x}}{\hat{w}}$$

and $$y = \frac{\hat{y}}{\hat{w}}.$$

Using screen space resampling based on two 1D resampling passes, the screen y coordinate is only used for mipmap determination purposes, as will be explained in more detail below. Using a one-pass 2D screen space resampler, the y coordinate is also used as input to the resampler. For computing the actual colors, the rasterizer may interpolate diffuse color (RGBA), specular color (RGB) and extra texture coordinate pairs (allowing for multi-texturing). Also other attributes (such as a surface normal) may be interpolated. Preferably, the texture space rasterizer traverses the texture map on a grid corresponding to 4D mipmapping. 4D mipmapping will be described below in more detail.

The texel shader 130 computes for each texel the local surface color. The texel shader operates on the attributes on grid positions in the surface grid and if there are any secondary textures associated with the primitive, it uses inverse mapping with a texture space resampler 132 to obtain colors from these. When texture data is needed, the texture space resampler is used to obtain a texture sample given the texture coordinates. These texture coordinates are generated by the texel shader based on the interpolated coordinates received from the rasterizer and any results from previous texture fetches (so-called dependent texturing) and/or calculations. The texture filter operation is usually based on bi-linear or tri-linear interpolation of nearby texels, or combinations of such texture probes to approximate an anisotropic (perspectively transformed) filter footprint.

The texture map is typically a 2D picture, such as a photograph or computer generated image. For example, (part of) a 2D image of a wall may be projected on a 3D representation of a wall in a computer game. Most 3D objects cover only a small part of the screen, often resulting in minification of the texture map (which is of sufficient resolution to also provide a reasonable appearance when viewed up close). Often, during texture mapping the 2D picture has to be minified considerably, for example if the wall is far removed. In principle, texture mapping could then be performed by significantly downscaling the original image. To reduce the bandwidth required for reading the high resolution 2D picture, a pre-processing step is preferably performed in which several downscaled versions of the 2D picture are created. During texture mapping, the part of only the smaller downscaled picture which matches best in resolution with the screen image is read and mapped to the screen. The original 2D picture along with its downscaled versions is called a mipmap. Texture mapping as well as mipmaps are particularly described in "Survey of Texture Mapping Paul S. Heckbert, IEEE Computer Graphics and Applications, November 1986, pp. 56-67 and in U.S. Pat. No. 6,236,405 B1. In a 3D mipmap, the original image is denoted as level 0. In level 1, each entry holds an averaged value of, for example, 2×2 texels. This can be continued until the top-level is reached, which has only one entry holding the average color of the entire texture. Thus, in a square mipmap, level n has one fourth the size of level n−1. Several types of mipmaps are known, varying in which downscaled images are stored. In the described 3D mipmap, both directions are downscaled by the same factors, while in a 4D mipmap the original image is downscaled independently in both dimensions. A 4D mipmap is specified by a horizontal mipmap level $mml_u$ and a vertical mipmap level $mml_v$. FIG. 2 shows a 4D mipmap giving details of 16 mipmaps levels (0,0), (1,0), . . . , (3,3). The mipmaps levels indicated in gray (0,0), (1,1), (2,2), and (3,3) form the original 3D mipmap levels 0, 1, 2, and 3, respectively. Compared to the 3D mipmap, the 4D mipmap arrangement requires a lot of memory to store. Computer graphics programs, such as games, therefore, often use the 3D mipmap structure. In a preferred embodiment, the texture memory 134 stores texture maps in a 3D mipmap structure. In such an embodiment, the texture space resampler 132 is preferably arranged to on-the-fly reconstruct a desired 4D mipmap from a 3D mipmap as described in the non-prepublished European patent application with attorney docket number PHNL010924EPP. A texture fetch then amounts to 4D mipmap reconstruction from the 3D mipmap data stored in the texture memory 134. Preferably, the texture space rasterizer traverses the texture map on a grid corresponding to 4D mipmapping. The rasterizer supplies for each texel (u,v) corresponding 4D mipmap levels ($mml_u$, $mml_v$) to the texel shader 130. In the example of FIG. 2, the 4D mipmap (3,0) is reconstructed through downsampling of the 3D mipmap level 0. A fetched texel can be combined with interpolated diffuse and/or specular color resulting in a color sample of the surface with associated (generally non-integer) screen coordinates which indicate where this texture sample is mapped to on screen. The texture space resampler obtains texture samples from secondary texture maps, for example, via standard bilinear interpolation. If so desired, this can be extended to trilinear or anisotropic filtering methods, and also support for fetching of 1D and 3D textures can be added (once this has been added the interpolation of the texture coordinates by the rasterizer also needs to be generalized to support a possible third coordinate).

The screen space resampler 140 splats mapped texels to integer screen positions, providing the image of the primitive on the screen. The screen space resampling includes the following operations:

Reconstructing the color information in the texel grid to a continuous signal,

Mapping the continuous signal from the texture space to the screen space,

Pre-filtering the mapped continuous signal in screen space, and

Sampling the pre-filtered signal in screen space.

Figure 3:
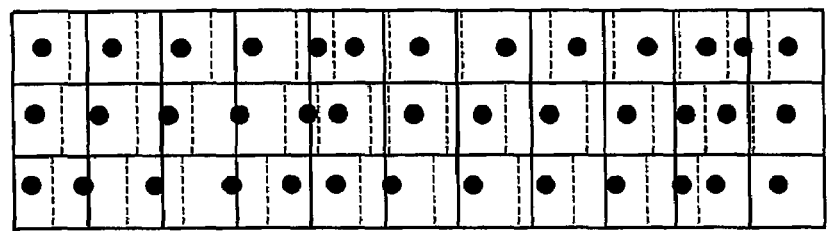
FIG. 3 illustrates reconstruction filtering.

It will be appreciated that also first the mapping from the texture space to the screen space may be performed, followed by reconstructing the mapped signal. FIG. 3 illustrates the mapping and reconstruction filtering using a box as the footprint of the reconstruction filter. Other filters, such as higher order filters may also be used. The figure shows a grid of pixels. Each pixel is shown as a rectangle around the dimensionless location of the pixel. The solid dots illustrate the location of the dimensionless input texel coordinates after the transformation (mapping). The footprints of the original texels are taken and projected onto the screen. The size and location of the footprints of the texel after transformation are shown as the rectangles with dashed lines in FIG. 3.

Figure 4:
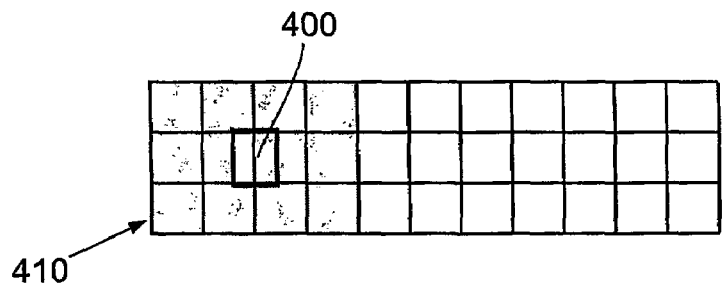
FIG. 4 illustrates screen space pre-filtering.

As illustrated in FIG. 4, next, each mapped texel is then splat to (i.e. distributed over) pixels in the screen space of which the pre-filter footprint in screen space overlaps with the reconstructed box in the screen space (i.e. after mapping the texel to screen space). The reconstructed box of texel 400 is shown with the highlighted rectangle 410. The pre-filter footprint may extend over several pixels. The filter may extend only horizontally, but may also have a vertical extent. In the example of FIG. 4, a filter is used that with both a horizontal and vertical extent of three pixels, centered on the pixel to which it belongs and covering two neighboring pixels. In this case, twelve output pixels receive a contribution. For each of those output pixels the contribution is determined by using the shape of their respective pre-filter to weigh the input texel value.

The pixel fragments coming from the screen space resampler are then combined in the Edge Anti-Aliasing and Hidden Surface Removal (EAA & HSR) unit 150 of FIG. 1, which may use a fragment buffer 160. Pixel fragments are depth-sorted into this buffer to solve the hidden surface problem. After all primitives have been rendered, all visible fragments for each pixel are combined (which mostly amounts to simple summation since the screen space resampler delivers colors already weighted by the pre-filter) and sent to the frame buffer. Edge anti-aliasing results from combining the partial contributions generated by the screen space rasterizer near the edges, resulting in a final pixel color which can be a combination of colors from different primitives.

Figure 5:
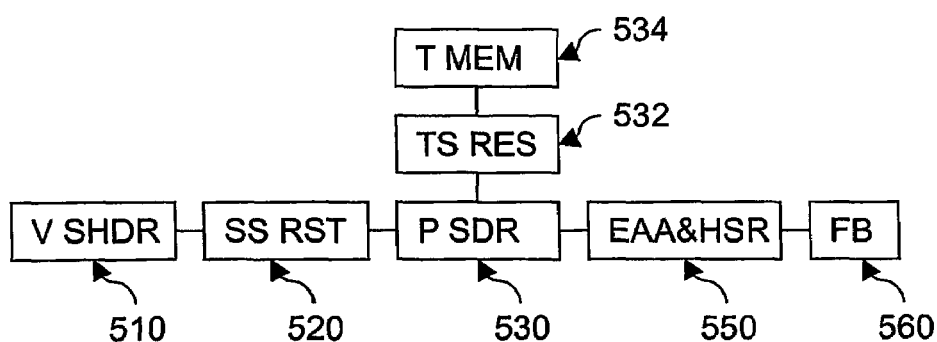
FIG. 5 shows a graphics pipeline of a forward texture mapping system.

FIG. 5 shows an exemplary architecture of the last stages of a graphics pipeline of an inverse texture mapping system. The vertex shader 510 of FIG. 5 performs a same role as the vertex shader 110 of FIG. 1. The rasterizer 520 of FIG. 2 operates in screen space, in a so-called inverse texture mapping system, i.e. pixels from the screen space are mapped to a texture in texture space instead of projecting the texture onto pixels of the screen. Such a rasterizer uses a scanline algorithm to traverse the pixels which lie within the projection of the primitive on the screen, by selecting the screen coordinates from the vertex attributes as driving variables for the rasterization process. The rasterizer thus traverses the primitive over a "screen grid". As coordinates in the screen space are used x (for the 'horizontal' direction) and y (for the 'vertical' direction). For the rest, the rasterizer 520 operates in a manner analogue to the rasterizer 120 of FIG. 1. Similarly, the pixel shader 530 of FIG. 5 operates in an analogous way to the texel shader 130 of FIG. 1; the texture memory 534 to the texture memory 134; the texture space resampler 532 to the texture space resampler 132; the EAA & HSR unit 550 to the EAA & HSR unit 150 and the fragment buffer 560 to the fragment buffer 160. The screen space resampler 140 of FIG. 1 and the texture space resampler 532 of FIG. 5 take care of mapping texture data obtained from texture memory (134, 534) to corresponding pixel data defining the display image. This mapping function is collectively referred to as texture mapping. As can be seen in FIG. 5 in an inverse mapping system this function is thus combined with the texture space resampling and located before the pixel shader 530, whereas in the forward texture mapping system this function is distributed over texture space resampler 132 and screen space resampler 140.

Dynamic Choice of Resampling Algorithm

Figure 6A:
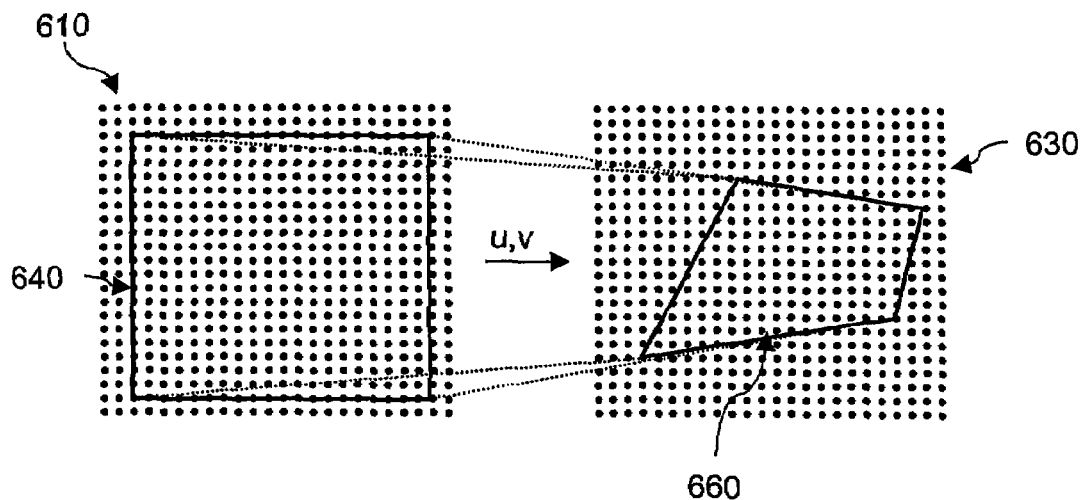
FIG. 6 illustrates one-pass and two-pass resampling.
Figure 6B:
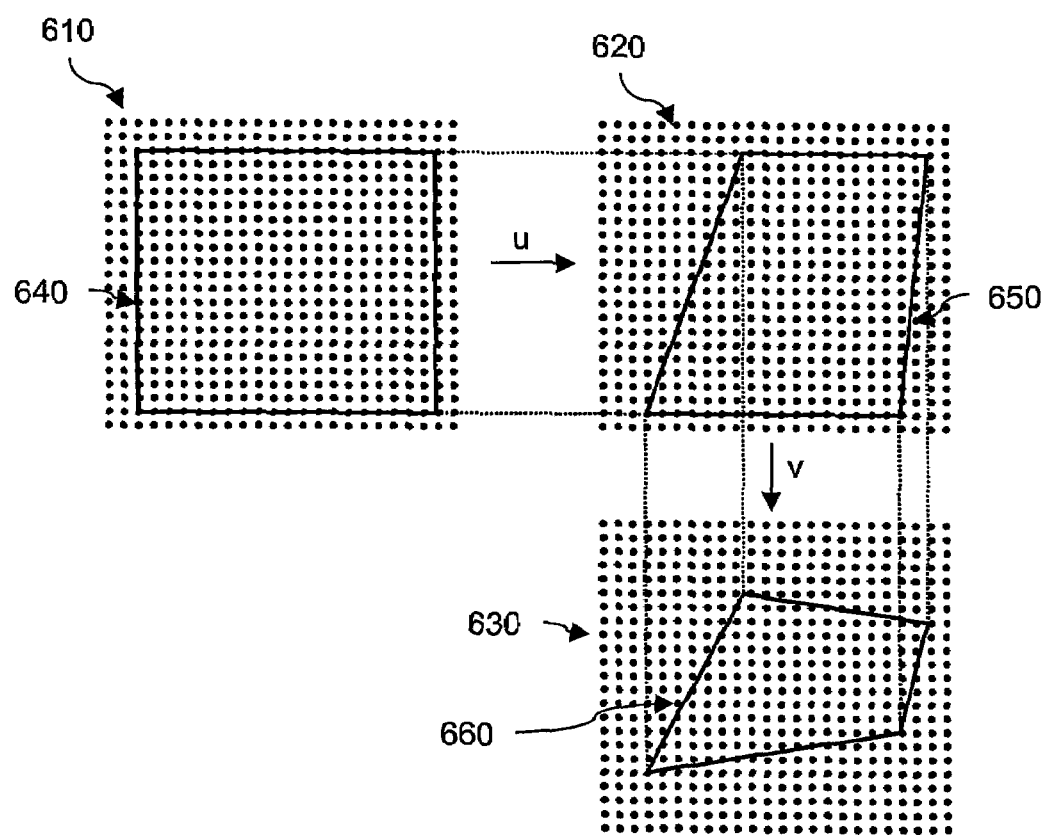

According to the invention, for the resampling done by the texture space resampler 132/532 and/or the screen space resampler 140 a choice exists between at least two distinct resampling algorithms. The algorithms may be convention algorithms. The resampler maps (resamples) a collection of input texls/pixels at given locations in an input grid to corresponding collection of output texls/pixels at locations in an output grid. Typically, the locations in the respective grids differ: a transformation takes place. The transformation may be a simple shift, rotation, magnification/minification, but may also be a perspective transformation. The input an output grids may be the same, but may also differ in location and/or resolution. The collection of pixels/texels involved are typically those that correspond to an object or a primitive used to model (part of_the object. Since the texture and screen are usually 2D, the resampling in principle is also 2D. The same principles can equally be applied to graphics or video processing for rendering of 3D images. For 3D rendering, the basic processing is also typically performed on 2D images. It is well-known how 3D images can be created using 2D techniques, such as projecting two distinct 2D images on the respective eyes of a viewer. The remainder will focus on 2D processing. FIG. 6A shows an example 610 of 23D resampling in one pass. In the example 610 of FIG. 6 the input grid 640, indicated by the regularly spaced dots, is the same as the output grid 630. Also the horizontal and vertical spacing is the same. It will be appreciated that the grids need not be the same and that the horizontal and vertical resolution may be different. FIG. 6A shows a resampling in texture space, indicated by the texel coordinates u, v. The same principle equally applies to resampling in screen space (typically using x and y coordinates). In the one pass resampling of FIG. 6A, texels that lie in a primitive (or entire object) 660 are resampled from the corresponding texels that lie within the area 640 of a texture map. A transformation occurs in both directions u, v. In one pass over the texels of the primitives, resampling occurs in both directions. FIG. 6B illustrates the same transformation but now using a two-pass resampling. In each pass resampling occurs in only one direction. In the example of FIG. 6B, the first pass resamples the input in the horizontal direction u, giving an intermediate picture where the input area 640 is mapped to the area 650. The grid of the intermediate image is indicated using 620. In the second pass the area 650 of the intermediate image is resampled only in the remaining direction (i.e. vertical in this example) to the final area 660 in the output image.

Figure 7:
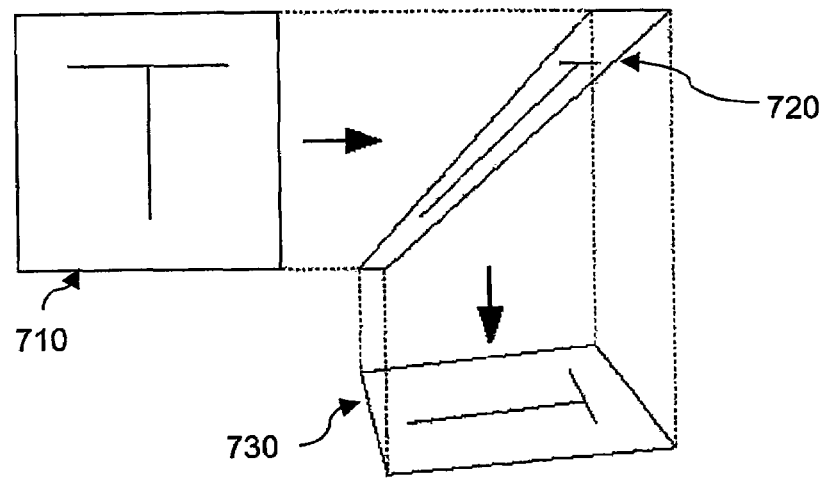
FIG. 7 shows a bottle-neck problem.
Figure 8:
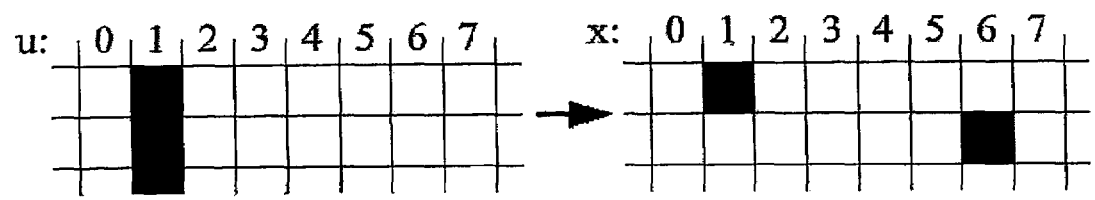
FIG. 8 shows a shear problem.

During resampling for each pixel/texel of the output values are accumulated (e.g. weighted contributions of one or more input pixels/texels). These intermediate results are buffered in an accumulation buffer. For one-pass resampling, an accumulation buffer is required for all pixels/texels of the output primitive 660 (in fact a 'two-dimensional' buffer). For two-pass resampling a one dimensional buffer is sufficient, since it is possible to perform the resampling per line (horizontal line for the first pass and vertical line for the second pass of FIG. 6B). After a line has been fully resampled, the accumulated outcome in the buffer can be moved to a full image output buffer (e.g. in the frame buffer) and the accumulation buffer can be used for resampling of the next line. In principle, a 1D resampler requires as an accumulation buffer only a few registers (the number of registers is determined by the number of taps, i.e. width, of the filter). However, for both passes it is required to store the intermediate image. By interleaving the horizontal and vertical passes, it is possible to reduce the storage requirements sufficient to a few line memories, depending on the filter width. Consequently, the accumulation buffer for two-pass resampling is significantly smaller than for one-pass resampling for a same size primitive. On the other hand, the setup for one-pass resampling is lower. For one-pass resampling, the resampler is initialized once for the entire primitive. For two-pass resampling, a set-up operation is required for both resampling steps. Moreover, without precautions, two-pass resampling is susceptible to the so-called bottleneck and shear problems. The bottleneck problem is illustrated in FIG. 7, where the area of the intermediate image 720 becomes very small relative to the input image 710 and output image 730. It occurs with rotations close to 90° and results in excessive blur in the direction of the second pass (since the second pass has to magnify the collapsed intermediate image again). The shear problem is illustrated in FIG. 8 where two lines of a texture map and intermediate image are shown (using box reconstruction for the pixels). The texture map has a black vertical line, and the shear of the perspective mapping is such that the black pixel on the second line ends up five pixels more to the right than the black pixel on the first line. The horizontal filter pass prevents horizontal aliasing, but not vertical aliasing. The shear causes a very sharp transition between black pixels on one line, and white pixels on the next. Also, the line in the intermediate image consists of disjunct parts, separated by columns to which the line does not contribute (e.g. for x=3). A solution to the shear problem is to rasterize at a finer resolution, causing extra intermediate lines to be generated, with a black pixel at intermediate positions filling the holes. The bottleneck problem can be avoided by choosing between four resampling options by deciding:

1) to generate the output image straight away, or generate a transposed version and transpose the generated image, and 2) doing the horizontal pass first, or doing the vertical pass first. Criteria that lead to the choice are preferably checked as part of the setup, increasing the setup time of the two-pass resampler. An optimal choice will reduce both bottleneck and shear problems.

It will be understood, that setting-up of resampling for a primitive in general requires a considerable part of the number of processing cycles required for the entire resampling (i.e. setting-up plus actual resampling). The relative setup overhead increases as the primitive decreases.

According to the invention, the resampler selects a resampling algorithm for performing the resampling from a set of at least two distinct resampling algorithms. It chooses the resampling algorithm in dependence on a size of the primitive. The size may be given, calculated or estimated in any suitable way. In particular, the size of the primitive depends on the number of texels within a boundary of the primitive, e.g. the number of texels that lie within the triangle [or the number of output pixels]. It is well-known how the number of texels within the boundary of a primitive can be calculated. It is a choice for the skilled person whether or not texels that do not fully fall within the boundary but do overlap the boundary for a given filter footprint of the texel are ignored or taken into account. If so desired, the size may be estimated (e.g. based on the maximum of the width and height).

Preferably, the resampler chooses the algorithm by comparing the size of the primitive to a predetermined threshold. For example, if the size is below the threshold, the one-pass resampling is chosen. If the size is above the threshold, the two-pass resampling is chosen. If there is a choice between more than two resampling algorithms multiple threshold value may be used. For example, different one-pass resampling algorithms may be used for different size primitives where the algorithms differ in the way bottleneck and/or shear problems are reduced.

As indicated above, the apparatus includes a buffer associated with the resampler for accumulating resampled data. The buffer has a predetermined buffer size. The threshold is then, preferably, chosen such that for the algorithm chosen for a primitive with a size below the threshold the accumulated data for the primitive fits in its entirety in the buffer and exceeds the buffer for larger primitives. Preferably, a one-pass 2-dimensional resampling algorithm is selected for primitives with a size below the threshold and a two-pass 1-dimensional resampling algorithm is selected for primitives with a size above the threshold.

Figure 9:
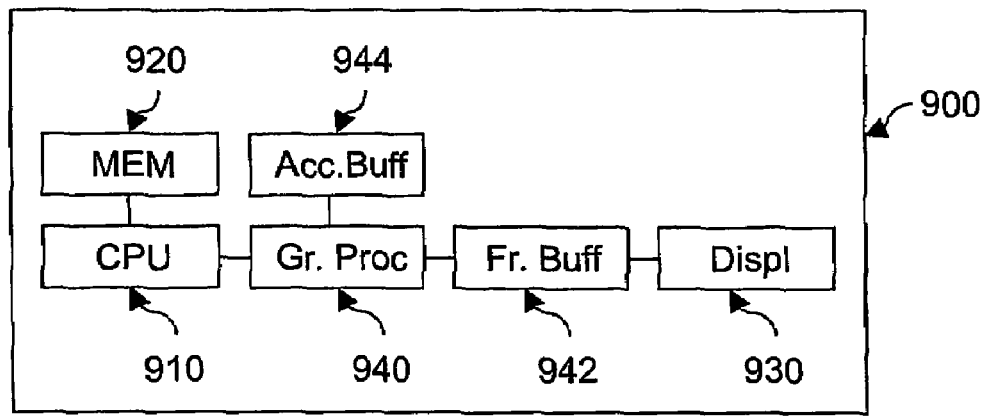
FIG. 9 shows a block diagram of a computer incorporating the graphics system according to the invention.

FIG. 9 shows a block diagram of a computer 900, including a central processing unit 910, a memory 920, a display 930, and a computer graphics system 940 according to the invention. The computer may be a convention al computer, such as personal computer, games console or workstation. The computer graphics system may be implemented using a graphics processor. Such a graphics processor may be operated under control of a program, causing the graphics processor to execute the method according to the invention. The program may be fixedly embedded (e.g. in ROM), but may also be loaded from a background memory. In the latter case, the program may be distributed in any suitable for, e.g. using a record carrier, such as a CD-ROM, or wired or wireless communication means, such as Internet. The computer graphics system 940 performs one or more of the functions described with respect to FIG. 1. In particular, the computer graphics system 940 may include or be attached to an accumulation buffer 944, as described above. Each resampler may be associated with a respective accumulation buffer. Preferably, the accumulation buffer is integrated in the same IC as the main graphics processor used for executing the graphics processing system. The accumulation buffer is preferably part of a cache memory. The computer graphics system 940 may also include or be connected to a frame buffer 942 containing the entire image to be displayed on the display 930.

Figure 10:
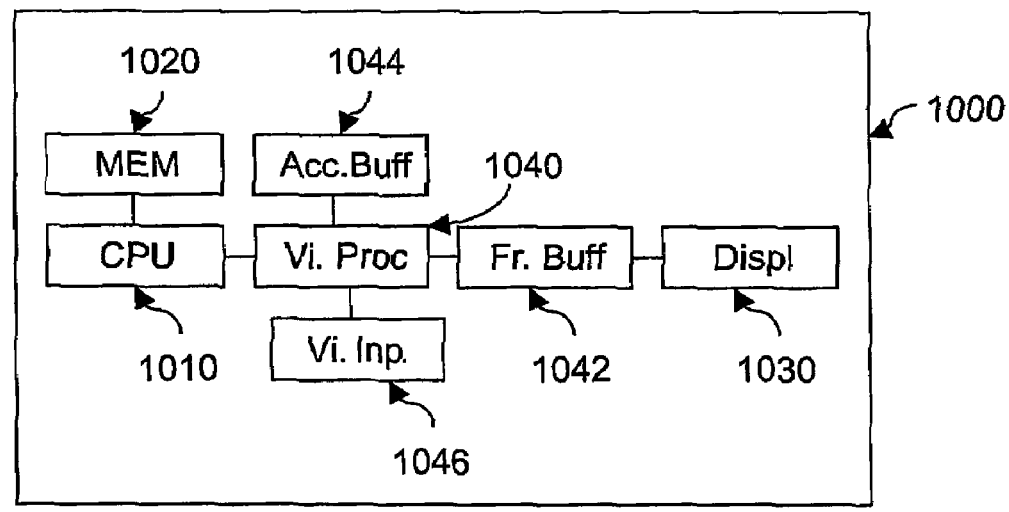
FIG. 10 shows a block diagram of a computer incorporating the graphics system according to the invention.

FIG. 10 shows a block diagram of a video processing system 1000, such as a television, including a central processing unit 1010, a memory 1020, a display 1030, and a video subsystem 1040 according to the invention. The video subsystem 1040 may be a implemented using a graphics or video processor. Such a processor may be operated under control of a program causing the processor to execute the method according to the invention. The program may be fixedly embedded (e.g. in ROM), but may also be loaded from a background memory. In the latter case, the program may be distributed in any suitable for, e.g. using a record carrier, such as a CD-ROM, or wired or wireless communication means, such as Internet. The video subsystem 1040 performs one or more of the functions described with respect to FIG. 1. In a way as described for FIG. 9, the video subsystem 1040 may include or be attached to an accumulation buffer 1044 to a frame buffer 1042 containing the entire image to be displayed on the display 1030. Typically, the video subsystem 1040 also receives a video stream via a video input 1046. The stream may be received using an internal tuner or may be supplied in an y other suitable way, e.g., via a video connection or digital network from a VCR, DVD player, set top box, etc. The video subsystem 1040 may combine graphical information, typically provided under control of the main processor 1010, with the video stream.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An apparatus for mapping primitives of a 3D graphics model from a texture space to a screen space; the apparatus including a texture memory for storing texture maps; and a resampler being operative to, for each primitive, resample data from a texture map that corresponds to the primitive to corresponding pixel data defining a portion of a display image that corresponds to the primitive; the resampler being operative to select a resampling algorithm for performing the resampling from a respective set of at least two distinct resampling algorithms; the selection being in dependence on a size of the primitive.

2. An apparatus as claimed in claim 1, wherein the resampler is operative to perform the selection by comparing the size of the primitive to a predetermined threshold.

3. An apparatus as claimed in claim 2, wherein the apparatus includes a buffer associated with the resampler for accumulating resampled data; the buffer having a predetermined buffer size; the threshold depending on the predetermined buffer size.

4. An apparatus as claimed in claim 2, wherein a first one of the resampling algorithms is a 1-pass 2-dimensional resampling algorithm and a second one of the resampling algorithms is a two-pass one-dimensional resampling algorithm; the first algorithm being selected for primitives with a size below the threshold and the second algorithm being selected for primitives with a size above the threshold.

5. An apparatus as claimed in claim 1, wherein the size of the primitive depends on the number of texels or pixels within a boundary of the primitive.

6. A memory storing a program for mapping primitives of a 3D graphics model from a texture space to a screen space, which when executed by a graphics processor, causes the graphics processor to execute the steps of: resampling in a texture space, for each primitive, data from a texture map that corresponds to the primitive to texture data for texels associated with the primitive; and resampling in a screen space, for each primitive, the texture data to corresponding pixel data defining a portion of a display image that corresponds to the primitive; and selecting for the texture space resampling and/or the screen space resampling a resampling algorithm from a respective set of at least two distinct resampling algorithms; the selection being in dependence on a size of the primitive.

* * * * *